Jan. 17, 1961 W. BRODBECK 2,968,224
PROFILE-MILLING AND ENGRAVING MACHINE
Filed Sept. 2, 1958 3 Sheets-Sheet 3

INVENTOR.
Willy Brodbeck
BY
Munn, Liddy, Daniels & March
ATTORNEYS

United States Patent Office 2,968,224
Patented Jan. 17, 1961

2,968,224

PROFILE-MILLING AND ENGRAVING MACHINE

Willy Brodbeck, Calmbach (Enz), Germany, assignor to Alfred Gauthier G.m.b.H., Calmbach (Enz), Germany, a corporation of Germany Filed Sept. 2, 1958, Ser. No. 758,457

Claims priority, application Germany Sept. 11, 1957

9 Claims. (Cl. 90—13)

This invention relates to profile-milling and engraving machines of the type wherein programing control devices automatically effect the relative movements between the tools and workpieces for the purpose of performing operations on the latter. The present invention concerns improvements in the profile-milling and engraving machine described and claimed in my copending application Serial No. 759,039 filed September 4, 1958 and entitled Profile-Milling and Engraving Machine.

The milling machine of my copending application referred to is of the type wherein the relative movements of the workpieces and the cutting tools correspond to a well-known coordinate system, as for example to the three coordinates X, Y and Z of a rectangular or three dimensional system. The construction of this referred-to machine embraces the provision of elongate control cams of the rectilinear type, by which the control program is effected and carried out. Such elongate or rectilinear cams commonly have their basis in a straight line, that is, the may be laid out and constructed with reference to a straight base or reference line. In the referred-to machine each one of such cams is mounted so that it may have lateral movement, i.e., movement in a direction normal to the straight basis line of the cam. Each one of such control cams is spring-biased against an unyielding stop or cam actuator which is movable longitudinally of the cam so as to traverse the latter, said stop or cam actuator being carried by an elongate guide which extends in a direction generally parallel to the straight basis line of the cam. Movement transmission devices, which may be mechanical, electrical or hydraulic, are provided for coupling the control cam supports to the workpiece and tool supports respectively, whereby the lateral movements of the cams as they are traversed by the stops or cam actuators is made to displace the workpieces and/or tools.

A profile-milling and/or engraving machine as above constructed is characterized especially by a desirable compactness and saving of space, by a simple and straightforward construction or fabrication and adjustment of the working program, as well as by a simple, reliable and precise mode of operation One object of the present invention is to provide an improved profile-milling and engraving machine of the type set forth in my copending application referred to, wherein duplicating or mass production of the workpieces may be economically effected with a high and uniform degree of accuracy and a minimum consumption time per unit workpiece, to the end that the advantage of economy of production characterizing the machine of my identified copending application may be still further increased.

In accordance with the invention, this is accomplished by the provision of novel means which are adapted to especially quickly return the stops or cam actuators to their initial starting positions after the same have fully traversed the control cams to machine a workpiece or set of workpieces.

Such quick-return mechanism is preferably made to be automaticaly operative in response to the cam actuators reaching the ends of their traversal movements, and to enable such quick return to be readily effected I further provide means for shifting the control cams to retracted positions and releasably holding them therein whereby they are not engaged by the cam actuators during the quick return movements of the latter.

A machine constructed in accordance with the foregoing and embodying the principles set forth in my copending application referred to is of distinct advantage by virtue of the operations on the workpieces being effected through uni-directional movements of the cam actuators. This insures a high quality and uniformity in the workpieces, with the elimination of even minor irregularities which would otherwise be present where there is lost motion or play between cooperable machine parts or components, particularly in the case where one workpiece is machined in response to shifting of the cam actuators in one direction and a subsequent workpiece is machined in response to opposite shifting movement of the cam actuators. By the present invention a short cycle time or time per workpiece is insured by virtue of the idle time of the tools, corresponding to the time in which the cam actuators are returned to their starting positions, being of very small, absolute value. An extremely rapid return movement of the cam actuators is made possible by eliminating all engagement of such actuators with the cams during such return interval. In consequence, the stops or cam actuators can complete their return movements without the slightest hindrance from external factors such as the control cams and the like. Moreover, by the above organization wherein the control cams are held out of engagement with the cam actuators during the return movements of the latter, there is eliminated any tendency for such cams to become worn by virtue of the non-productive return movements of the actuators. Accordingly, the greatest possible use may be made of the cams, with a high degree of accuracy and uniformity in the produced work. Thus, a profile-milling and engraving machine as above constructed in accordance with the invention makes possible in an advantageous manner an economical and precise mass production of workpieces one after another, especially where such a machine is provided with automatic workpiece feed and discharge means of the type adapted to handle the workpieces in quick succession.

Further, in accordance with the invention, the improved profile-milling and engraving machine as provided herein may be readily adapted to various requirements of accuracy and working conditions, thereby to effect in all cases a maximum economy of operation, by the provision of a change-over device and a selector means controlling the same, to enable the quick-return of the cam actuators to be either utilized or not utilized, at the will of the operator.

By the provision of such selector means whereby the quick-return of the cam actuators may be optionally utilized, the particular mode of operation of the machine as involving such mechanism may be chosen at will to suit the respective requirements of accuracy in the machining of the workpieces. That is, in the case where the profile-milling or engraving operations are not such as to require close tolerances, the operation of the machine may embrace the machining of one workpiece or set of workpieces in response to movement of the cam actuators in one direction, and the machining of the succeeding workpiece or set of workpieces in response to movement of the cam actuators in the reverse directions, i.e. the directions which return the cam actuators to their starting positions.

With this type of operation of the machine there is eliminated the maximum amount of idle time, thereby resulting in the shortest possible cycle of operation or production time per workpiece. If, however, the workpieces must be machined to close tolerances, then by the simple actuation of the selector device or switch, the machine can be easily and quickly changed over to the quick return movement of the cam actuators, wherein the machining of the workpieces is at all times effected by a traversing movement of the cam actuators always in one direction. With this latter arrangement, taking into consideration the accuracy that is required in the finished workpieces, there is effected the shortest possible time for each cycle during which a workpiece is produced. Therefore, there is likewise obtained the maximum economy in the use of the machine.

In effecting in an advantageous manner a return of the cam actuators in the shortest possible time, and in the interest of economy and simplicity, I provide a special or separate motive means to effect the quick return of the actuators to their initial or starting positions.

In the accompanying drawings there is illustrated one embodiment of the invention.

Figure 1:
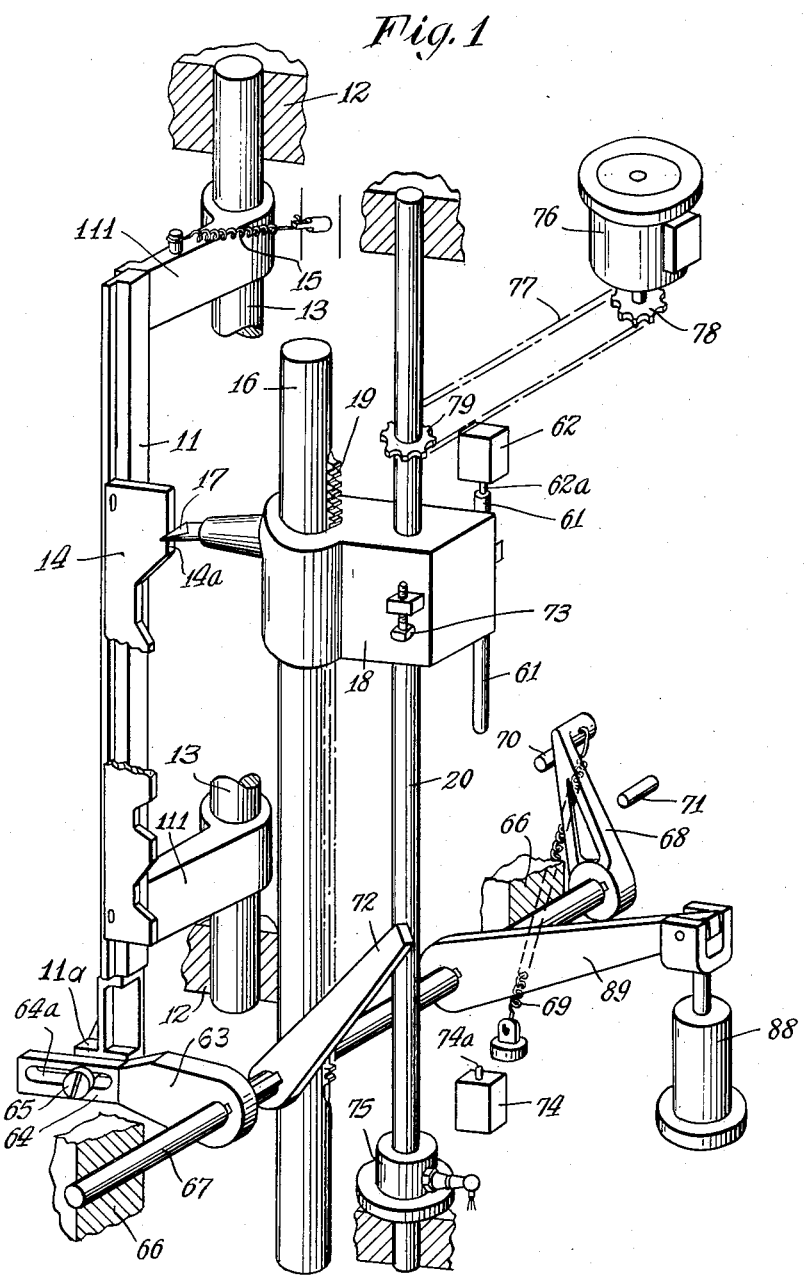
Figure 1 is a schematic perspective view of a portion of a programming mechanism effecting a quick return of the cam actuators as provided by the invention. A stop or cam actuator is shown at the end of its traversing movement, after it has actuated the rectilinear cam to shift the latter to a retracted position wherein it will not be engaged by the cam actuator during the return movement thereof.

Various details of the profile-milling and/or engraving machine including the base or housing structure thereof, the workpiece and tool slides, coupling means or transmission means associated therewith, etc. are, for the sake of simplicity, not shown herein since they are fully illustrated and described in my copending application above referred to. In Figure 1 those components which are similar and function in a manner similar to components illustrated and described in my copending application have been given like reference character to facilitate an understanding of the present invention and the improved programming and return-action device thereof. As shown in Fig. 1, there is provided an elongate support means or structure 11 carried by suitable arms 111 which are rigidly secured to a turnable spindle 13 mounted in fixed bearings 12 disposed on the base or housing of the machine. The support means 11 carries a program control cam 14 of the rectilinear type, said cam being elongate and usually constructed by laying out and forming the various profiles with reference to a straight reference line or basis line. The control cam 14 is biased by means of a spring 15 so that it is normally held in continual engagement with an unyielding stop or cam actuator 17 rigidly secured to a movable support or carriage 18. The support or carriage 18 is shiftable vertically on a guide post 16 which extends in a direction generally parallel to the straight line of reference or basis line of the control cam 14. It will be understood that the cam 14 is shiftable laterally about the axis of the spindle 13, by virtue of the mounting provided by the support 11 and the arms 111 at the top and bottom of the support, which arms are fixed to the spindle 13.

As in the construction of my copending application referred to, the support or carriage 18 is constituted as a gear housing having in its interior a gear train details of which are not shown herein. The gear train within the housing 18 is driven by a drive shaft 20 which passes through the housing, and one gear of the gear train engages a rack 19 carried by the guide post 16. The arrangement is such that when the shaft 20 is rotated, the housing 18, together with the stop or cam actuator 17 is made to traverse the guide post 16 and cam 14.

In accordance with the present invention, after the cam actuator 17 has been made to traverse the control cam 14 from the bottom to the top thereof, it is automatically quickly returned to its lowermost, initial or starting position. Moreover, during such quick return of the cam actuator 17 the cam 14 is held in a laterally shifted, retracted position whereby it is out of engagement with the said cam actuator. Such retracting movement of the cam 14 is effected automatically when the actuator 17 completes its traversing movement, and the cam 14 is later permitted to shift laterally forward again to its operative position upon the cam actuator 17 fully returning to the said starting position. In effecting such retraction and disengagement of the control cam 14 I provide a novel locking device which is made operative to hold the cam retracted after the latter has been initially shifted to its retracted position, said locking device being automatically rendered inoperative upon the cam actuator completing its return movement to the initial or starting position thereof.

In the illustrated embodiment of the invention of Fig. 1, after the cam actuator 17 has completed its traversing, upward movement along the control cam 14 it is returned to its lowermost position by means of a quick-drive mechanism. For the purpose of switching on the said quick-drive mechanism there is provided on the support or gear housing 18 a ram 61 adapted to actuate an electric switch 62 at the time that the gear housing and the cam actuator 17 attain the end of the cam-traversing movement. The switch 62 effects an energization of the quick-drive mechanism, as will be shortly described in detail. In Figure 1, the gear housing 18 and cam actuator 17 are shown in their uppermost positions, at the end of the cam-traversing movement thereof, and the ram 61 is shown as actuating the pin 62a of the switch 62.

Shortly before the ram 61 strikes the pin 62a, the cam actuator or stop 17 engages the end portion or land 14a of the control cam 14. The said land 14a is of greater height than all of the other lands or steps provided on the control cam 14, and accordingly when the actuator 17 engages the land 14a the cam 14 and the support 11 therefor are shifted laterally backward or retracted to the greatest extent, against the action of the biasing spring 15. Also, at the time that the cam actuator 17 reaches and engages the land 14a on the cam 14 the various operations which are to be performed on the workpiece have all been completed. Thus, the end portion 14a of the cam does not exercise any control function in connection with the machining of the workpieces but instead functions exclusively in connection with the indexing or actuation of the quick-acting return mechanism for the cam actuator.

The said maximum retracting movement of the cam 14 as effected by engagement of the actuator 17 with the land 14a serves to render operative a locking device, in accordance with the invention, the function of which device is to retain the cam 14 in its retracted position during the rapid, return movement of the cam actuator 17 to its lowermost position. That is, during the return movement of the actuator 17 it does not engage the profile of the cam 14 at all, nor is it hindered thereby since the cam is retained in a fully retracted position. In the illustrated embodiment of the invention, the said locking device comprises a shiftable lever 63 which is cooperable with a stop or abutment piece 64, the latter being rigidly carried by the support structure 11 for the cam 14. As shown, the end of the lever 63 is adapted to engage the abutment piece 64, thereby to hold the cam 14 in fully retracted position. The abutment part 64 is adjustably mounted on the support 11, being shiftable in a guide 11a thereof, and may be locked in different adjusted positions by means of a screw 65 passing through a slot 64a provided in the piece 64. The lever 63 is mounted on a shaft 67 which is carried in fixed bearings 66 which may be supported on the frame of the machine. The shaft 67 is spring-urged in a counterclockwise direction by means of a helical extension spring 69 connected with a lever 68 rigidly mounted on the shaft 67, as shown. A stop pin 70 limits counterclockwise turning of the lever 68 and shaft 67, and a second stop pin 71 limits clockwise turning of the lever and shaft, as will be readily understood. The spring 69 and stop pin 71 are so arranged that when the lever 68 engages the stop pin it has not yet reached its dead center position; thus the spring 69 exerts a continuous counterclockwise torque on the shaft 67. I further provide a lever 72 which is rigidly secured to the shaft 67 and adapted to cooperate with a stop or abutment screw 73 fixedly mounted on the gear housing 18. The action of the lever 63 is such that, when the cam 14 is shifted to its retracted position by engagement of the actuator 17 with the raised land 14a of the cam, the end of the lever 63 will engage the adjoining end of the abutment piece 64, as shown in Fig. 1, under the action of the spring 69. Thus, the cam support 11 and the cam 14 are locked in their retracted positions in response to the cam actuator 17 reaching and engaging the land 14a of the cam 14. Since the land 14a of the cam has the greatest height of all of the steps or lands provided on the cam, and since the lever 63 locks the cam 14 in this fully retracted position, the cam actuator 17 when being returned to its initial, lowermost or starting position does not at any time engage the cam 14. Upon the support 18 and the cam actuator 17 completing their return movement to the initial or starting position the locking means which holds the cam 14 retracted is rendered inoperative, thereby enabling the cam to resume its normal, forwardly shifted, operative position. This action is effected in response to the abutment screw 73 engaging and shifting the lever 72 and causing a clockwise turning movement of the shaft 67 to disengage the lever 63 from the abutment piece 64. In consequence, under the action of the biasing spring 15 the control cam 14 is again brought into engagement with the cam actuator 17 in readiness for the next traversing movement of the cam actuator.

Upon the support or gear housing 18 commencing its upward, traversing movement, the stop screw 73 becomes disengaged from the lever 72, whereupon the spring 69 causes the lever 63 to engage the upper side surface of the abutment piece 64. However, since the biasing spring 15 is much stronger than the spring 69, the engagement of the lever 63 with the abutment piece 64 will not cause any shifting of the cam support 11 or the cam 14.

When the gear box 18 and the cam actuator 17 terminate their return movement, reaching the lower end of the cam 14, the ram 68 engages a pin 74a of an electrical switch 74, which latter deenergizes or turns off the rapid-acting return mechanism and also conditions the normal drive and motive means by which the cam actuator is caused to traverse the cam. The manner by which this is accomplished is shortly to be described in detail.

In the illustrated embodiment of the invention one motive means is utilized to effect the normal or programming drive of the shaft 20 by which the actuator 17 is caused to traverse the cam 14, and a separate motive means is provided for effecting the rapid turn of the cam actuator to its initial or starting position. The normal drive mechanism may include a motive means in the form of an electric motor 80 not shown in Fig. 1, which is coupled to the drive shaft 20 by means of an electro-magnetic coupling 75. Such arrangement is utilized to effect the raising, working movement of the cam actuator 17 whereby it traverses the cam 14 from the lower to the upper end thereof. The rapid return mechanism includes a separate driving motor 76, which is connected with the drive shaft 20 by means of a chain 77 and sprockets 78 and 79. When the normal drive, effected through the magnetic coupling 75, is operative the motor 76 is de-energized and runs idle, being driven by the shaft 20 and sprockets and chain. However, when the rapid return motor 76 is energized for effecting rapid return of the cam actuator 17, the normal drive motor is uncoupled from the shaft 20 by de-energization of the electro-magnetic coupling or clutch 75. Thus, the shaft 20 is driven exclusively by the motor 76 in effecting the return movement of the cam actuator 17. The speed of the motor 76 is considerably greater than the speed of the motive means which is utilized for the normal drive.

By the above organization, as shown in Fig. 1, it is readily possible to shift the cam actuator 17 from its lowermost position to its highest position at a speed readily adapted for the machining operations which are to be performed, whereas after the cam actuator has reached the upper end or land 14a of the control cam 14 it may be much more rapidly returned to its initial or starting position at the lower end of the cam by means of the quick-return motor 76 as the latter is automatically energized by actuation of the switch 62. It will be understood that before the rapid return of the cam actuator 17 begins, the locking device 63, 64 becomes operative as explained above in response to the cam actuator 17 engaging the land 14a of the cam 14; thus, the control cam 14 is held retracted and prevented from engaging the cam actuator 17 during the rapid return movement of the latter. Upon the cam actuator 17 reaching its lowermost position the locking device 63, 64 is rendered inoperative by the parts 72, 73 to enable engagement between the cam 14 and the cam actuator 17 in preparation for the start of a new working cycle.

The time consumed by the cam actuator 17 in traveling from its highest to its lowermost position is only a fragment of the time required for shifting the cam actuator upward in its working stroke, since the drive shaft 20 is driven at a much greater speed by the motor 76 than by the motive means acting through the magnetic coupling 75; moreover, during the rapid return movement of the cam actuator 17 it is out of engagement with the control cam 14 and therefore completely unhindered by any external influence.

By the provision of the separate driving motor 76 for effecting the rapid return of the cam actuator 17 a desirable simplicity and economy is effected in the return mechanism while at the same time the return movement may be made as speedy as desired. As shown in Fig. 1 the return mechanism may be characterized by a direct coupling of the driving motor 76 to the drive shaft 20 without intermediate shafts or the like. Also, by the provision of the separate motive means, one for effecting the relatively slow traversal movement of the cam actuator and the other for effecting the rapid return movement thereof, it is not necessary to employ speed-changing gearing, double coupling devices and the like, and the two different rotative speeds of the drive shaft 20 may be obtained in the simplest possible manner by the use of the two separate motors of different speeds.

Figure 2:
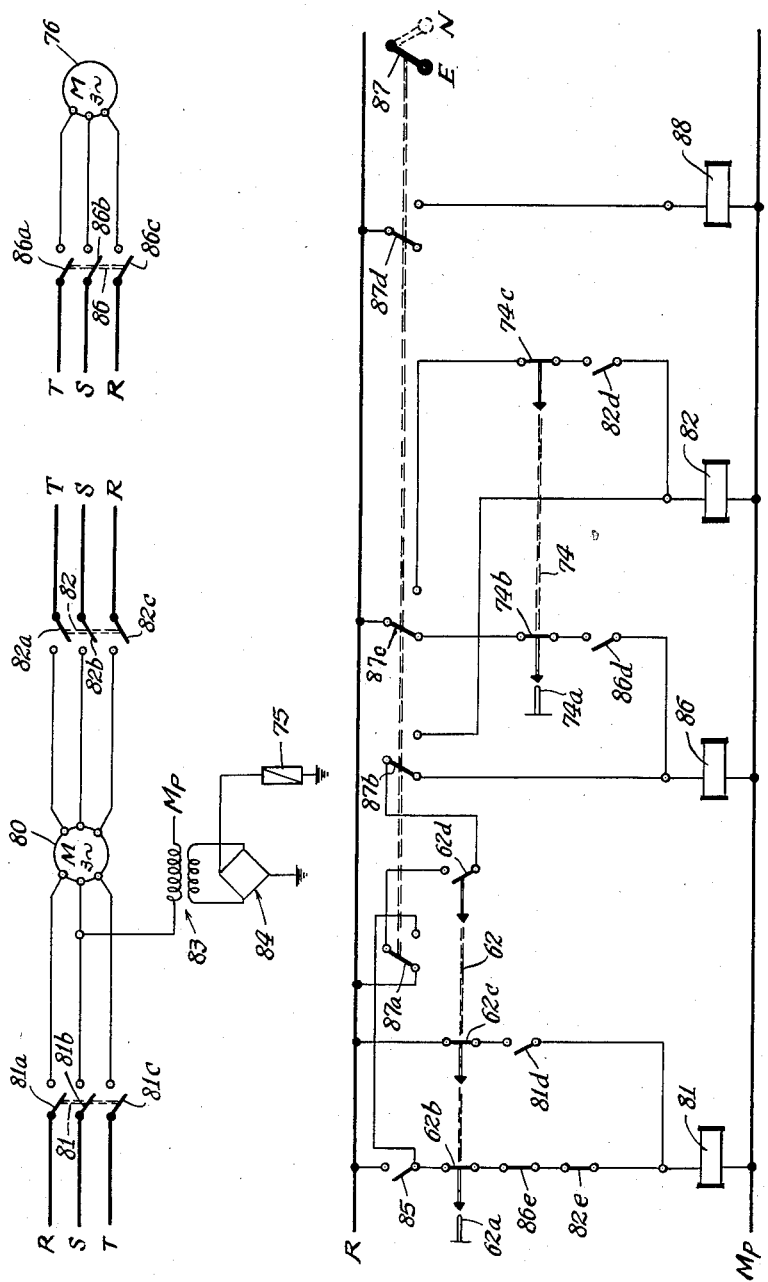
Fig. 2 is a schematic diagram of the electrical circuit and components, associated with the device shown in Fig. 1.
Figure 3:
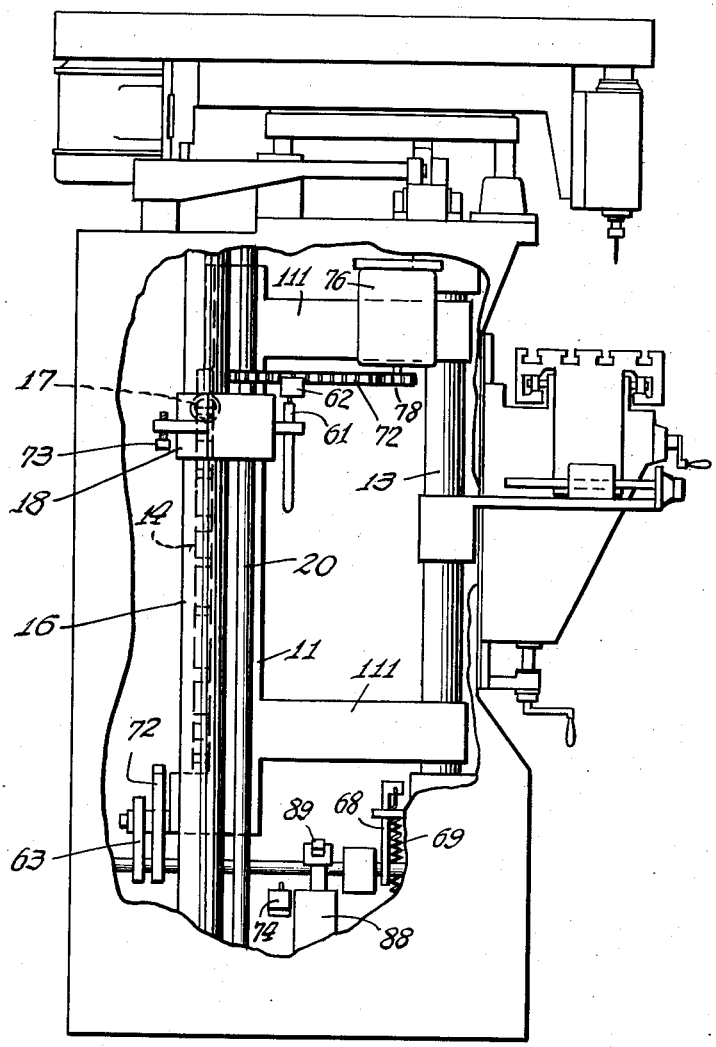
Fig. 3 is a side elevational view of a profile milling and engraving machine constructed in accordance with the invention, revealing details of the transmission devices incorporated in the programming mechanism. The showing of this figure is schematic in some respect, for purposes of clarity of illustration.

The schematic diagram of Fig. 2 shows the electrical system connected with the switches 62 and 74, by which the above mentioned control operations and the results effected thereby, are obtained.

The motive means for the normal drive of the shaft 20, by which the working stroke of the cam actuator 17 is obtained, is not shown in Fig. 1 for reasons of clarity of illustration and lack of space. This motive means is illustrated in Fig. 2, being shown as a three phase motor 80. By means of a relay 81 the motor 80 can be connected to the phases R, S and T of a three phase current supply. By the provision of a second relay 82, the motor 80 may be connected to another three phase current supply having changed phases, indicated by the letters T, S and R. By such organization, energization of the one relay 81 or the other relay 82 will effect operation of the motor 80 in either forward or reverse direction.

For the purpose of obtaining a low voltage direct current, a transformer 83 is connected to the center phase S and the center conductor Mp of the power supply system, said transformer feeding into a rectifier bridge 84 adapted to deliver direct current on the order of 25 volts for example to the electromagnetic coupling 75.

For the purpose of energizing the relay 21 at the beginning of the workpiece machining operation, thereby to effect traversing movement of the cam actuator 17 there is provided a momentary contact switch 85 which in normal condition is open circuited. Such normal condition, for example, may be obtained by a suitable spring means. For energizing the programming motor 80, the relays 81 and 82 each have three sets of contacts 81a, 81b, 81c and 82a, 82b, 82c respectively. Also, the relay 21 has a fourth contact 81d, while the relay 82 has two additional contacts 82d and 82e.

For the purpose of energizing the rapid return motor 76, which is also constituted as a three phase motor, a relay 86 is used. This relay has contacts 86a, 86b, and 86c for connecting the motor 76 to the source of power, and has additional contacts 86d and 86e.

The switches 62 and 74 are provided with contacts 62b, 62c, 62d and 74b, 74c respectively. I also provide further a selector switch 87 adapted for manual operation, said switch having contacts 87a, 87b, 87c and 87d and being settable in two positions labelled "E" and "N."

The wiring diagram for the above-mentioned parts and components is clearly shown in Fig. 2, and the positions of the switches are those corresponding to the location of the support or gear box 18 at rest in its lowermost position, with the selector switch 87 adjusted to the position "E."

Referring to the diagram of Fig. 2, the detailed operation of the control device of the present invention as illustrated in Fig. 1 is essentially as follows:

(1) *For setting "E" of the selector switch 87 whereby the rapid return of the cam actuator is to be utilized*

When it is desired to start the machine for the purpose of carrying out a certain operation, the starting switch 85 is momentarily depressed. This energizes the relay coil 81, closing the contacts thereof so that the electro-magnetic coupling 75 is energized and made operative, and also the programming motor 80. In consequence of this, the support or gear housing 18 and the cam actuator 17 are caused to travel upward so that the latter traverses the cam 14. The relay 81 has a holding contact 81d which is closed at the time that the relay coil 81 is energized, and said holding contact maintains energization of the relay 81 after the momentary contact switch 85 is released and allowed to reopen.

When the support 18 and cam actuator 17 reach their uppermost positions the ram 61 engages and actuates the pin 62a of the switch 62, and the latter by means of contacts 62b and 62c open the circuit through the relay coil 81, thereby de-energizing the said relay and also the programming motor 80 and the electromagnetic coupling 75. In consequence, the upward traversing movement of the support 18 and the cam actuator 17 is halted.

Actuation of the switch 62d causes energization of the relay coil 86 and actuation of this relay, effecting a closing of the contacts controlled thereby. In consequence, the rapid return motor 76 is energized, and at the same time a holding circuit is established through the relay coil 86 by virtue of the relay contacts 86d. As a result of the holding circuit, the relay 86 remains energized even though the ram 61 now separates from the control pin 62a of the switch 62, releasing the said switch. By virtue of energization of the rapid return motor 76, the shaft 20 is rapidly driven in a reverse direction, thereby shifting rapidly downward the support 18 and the cam actuator 17. When the relay 86 is energized the contact 86e thereof is opened, and accordingly no energization of the relay 81 may be effected even though the switch 85 by mistake should be closed during the rapid return motion of the cam actuator 17. Therefore, the programming motor 80 and the electromagnetic coupling 75 may not be inadvertently energized during the return movement of the cam actuator 17.

When, by virtue of the quick-return movement of the cam actuator 17 and support 18 these parts reach their lowermost position, the ram 61 strikes the pin 74a of the switch 74. Actuation of the switch 74 opens the contact 74b thereof, thereby deenergizing the relay 86 and in consequence the rapid return motor 76. By this action, the descending or return movement of the support 18 is halted. Thus, the complete cycle of operation of the apparatus is terminated and the machine is again in readiness for performing another machining operation, on a succeeding workpiece.

It will be understood that when the support or gear box 18 reaches its lowermost position as above explained, the actuation of the lever 72 thereby renders inoperative the locking device 63, 64 so that the control cam 14 which was held in retracted position by such locking device is now allowed to shift forward under the action of the spring 15 to its normal operative position in readiness for a new working cycle.

(2) *For setting "N" of the selector switch 87, effecting the normal drive of the programming device without utilizing the automatic rapid return mechanism*

To start the machine, the manually operable switch 85 is momentarily depressed, in the same manner described above, thereby causing the support 18 and the cam actuator 17 to move upward, the latter traversing the cam 17 and shifting the same laterally in accordance with the profile or contour thereof. When the support 18 reaches its uppermost position the ram 61 engages and actuates the pin 62a of the switch 62, thereby de-energizing the relay 81. This de-energizes the motor 80 and halts the support 18 and also the cam actuator 17 carried thereby.

To now cause further actuation of the support 18 in a reverse direction, the switch 85 is again momentarily depressed. This now energizes the relay 82, by which the programming motor 80 is energized from the other three phase supply. Due to said other supply having its phases interchanged, the motor 80 is operated in a reverse direction, and accordingly the support 18 is now driven downward along the guide bar 16. It may be further noted that when the relay 82 is initially energized, it is maintained in energizing condition by virtue of a holding contact 82d. Also, the relay contact 82e is opened, thereby opening the circuit through the relay 81. As a consequence of this latter, during the downward movement of the support 18 and cam actuator 17 it is not possible to energize the relay 81 for forward operation of the programming motor 80, as by accidental actuation of the starting switch 85.

When the support 18 reaches its lowermost position, the ram 61 strikes the pin 74a of the switch 74, and in consequence of this the relay 82 is de-energized and therefore the motor 80 is halted, bringing the support 18 and cam actuator to a halt.

A further action takes place when the selector switch 87 is in the setting "N" by which normal drive of the cam actuator is effected, without the quick return mechanism being operative. Through a contact 87d actuated by the switch 87 energization of a magnet or solenoid 88 is effected. This solenoid is coupled to a lever 89 affixed to the shaft 67 whereby energization of the solenoid will cause a clockwise turning of the shaft. In effecting such turning of the shaft 67, it is understood, of course, that the solenoid 88 is more powerful than the spring 69, whereby energization of the solenoid will bring the arm 68 against the stop 71. This clockwise turning of the shaft 67 will render inoperative the locking device 63, 64. Therefore, when the selector switch 87 is shifted to "N" position, the cam 14 is never held in a retracted position but is always biased by the spring 15 for engagement with the cam actuator 17.

The above arrangement thereby constitutes a switching over device comprising the solenoid 88 and lever arm 89, said device being controlled by the selector switch 87. Therefore, by means of the said switching over device, the rapid return mechanism for the cam actuator 17 may be at the will of the operator either rendered operative or inoperative.

By the above organization, in accordance with the invention, there is the important advantage that the control mechanism of the machines which is best suited to a specific requirement of production, as regards accuracy of the workpieces and the like, may be readily selected, thereby to utilize the machine in the most economical manner. When the selector switch 87 is placed in the "E" setting for effecting rapid return of the cam actuator 17 the workpieces are machined only in response to upward movement of the cam actuator, and the downward movement thereof serves only to reset the components in readiness for another upward traversing movement. However, when the selector switch 87 is placed in the "N" setting, signifying a normal drive operation, workpieces can be machined with both the upward traversing movement of the cam actuator 17 and also with the downward traversing movement of said cam actuator. Therefore, within a single cycle of operation of the cam actuator 17 embracing an upward and downward movement thereof, two workpieces can be machined, in which case the second workpiece is machined in a reverse sequence of operations, as compared with the first workpiece.

The setting "E" of the selector switch 87 is preferably utilized when workpieces of highest accuracy are required, whereas the "N" setting of the switch may be used for workpieces where the tolerances required of the machining operation are not too critical. Accordingly the setting "E" will be utilized with all types of precision engravings, whereas ordinary form-milling operations may be carried out by use of the switch setting "N."

Moreover, by the provision of the selector switch 87 a further advantage is had in that it is possible to quickly and easily try both settings of the machine with actual workpieces, to ascertain in a most reliable manner whether the "N" setting provides sufficient accuracy and uniformity in the workpieces, or whether the "E" setting is necessary to accomplish the desired accuracy. Therefore, no calculations or other considerations are required in order to decide which setting is most suitable for a particular job. Without complications or difficulty, by merely actuating the single control lever or switch 87, it is possible to arrive at a decision based on practical results, as to whether the rapid return mechanism must be utilized or not.

For the purpose of clarity of illustration the described embodiment of the invention embraces the single control cam 14 and the single cam actuator 17 cooperating therewith. Where, however, a number of control cams are to be utilized in conjunction with cooperable cam actuators, as in the machine described in my copending application above referred to, the present invention may be advantageously utilized, with the respective control cams being shifted and held out of the way while the cam actuators, preferably all mounted on the single support 18, are rapidly returned to their initial starting positions. Furthermore, the invention is not limited to the particular type of mounting for the control cam 14, since it has utility whether the supports 11 are carried by the arms 111 secured to the turnable spindle 13, or are movably supported by other means as for example by straight guides or the like. Also, the improved profile-milling and engraving machine of the invention may possess a plurality of workpiece supports whereby several workpieces may be simultaneously machined. In any case, the use of the invention enables the profile-milling and engraving machine to be operated with the maximum economy, considering the accuracy which is required of the workpieces.

I claim:

1. A milling machine comprising a base; workpiece mounting means and tool mounting means carried by the base, at least one of said means being movable on the base for enabling relative shifting multi-directional movements to be had between a tool and workpiece in directions corresponding to axes of a multiple coordinate system to perform operations on the workpiece; program means for shifting said mounting means along several axes according to a predetermined work-performing plan, said program means including an elongate control cam for effecting movement along one such axis, said cam being movable laterally and being connected with said one mounting means, and said program means further including an unyielding cam actuator movable longitudinally of said cam to traverse the same in engagement therewith, thereby to effect predetermined lateral movements of the cam as determined by the contour thereof; means actuated when the cam actuator completes its traversal of the said cam, for shifting the latter to a retracted position wherein it is removed from normal engagement with said actuator; means releasably locking the cam in said retracted position; rapid-acting means for quickly returning the cam actuator to initial starting position, preparatory to a subsequent traversal of the cam; and release means rendering inoperative said locking means as the cam actuator attains the said starting position, thereby to reset the said cam for a subsequent traversal.

2. The invention as defined in claim 1 in which there is a manually-operable selector device, and means including a switch controlled by said selector device for rendering inoperative the said rapid-acting means.

3. The invention as defined in claim 1 in which the rapid-acting means includes a separate motive means for actuating the said cam actuators.

4. The invention as defined in claim 1, in which the means for shifting the cam to retracted position comprise a sloping portion on said cam and a relatively high land adapted to be engaged by the cam actuator.

5. The invention as defined in claim 1, in which the means releasably locking the cam in retracted position comprises an abutment on said cam and a lever carried by the machine base and engageable with the said abutment.

6. The invention as defined in claim 5, in which the abutment on the cam comprise a member adjustably carried by the cam and adapted to be fixed in predetermined positions, thereby to determine the exact retracted position of the cam.

7. The invention as defined in claim 5, in which the means rendering inoperative the said locking means comprises a lever arm connected with the said locking lever to shift the latter, and comprises an abutment on the cam actuator, engageable with the said lever arm when the actuator attains its starting position.

8. The invention as defined in claim 1, in which there is a motive means and a drive mechanism connected therewith, for causing traversal of the cam by the said cam actuator, and in which there is a releasable clutch in the said drive mechanism, for disconnecting the motive means from the cam actuator at the time that the said rapid-acting means is in operation.

9. The invention as defined in claim 1, in which there is a manually operable switch means and a solenoid connected with said switch means to be controlled thereby, for rendering inoperative at will the said locking means, said solenoid being coupled to the locking means to actuate the latter.

References Cited in the file of this patent
UNITED STATES PATENTS 2,720,141    Seyferth  --------------- Oct. 11, 1955

FOREIGN PATENTS 1,111,279    France  ---------------- Oct. 26, 1955